United States Patent [19]
Kurosu et al.

[11] Patent Number: 4,975,977
[45] Date of Patent: Dec. 4, 1990

[54] ROTATION PROCESSING METHOD OF IMAGE AND SYSTEM THEREFOR

[75] Inventors: Yasuo Kurosu, Yokosuka; Hidefumi Masuzaki, Hadano, both of Japan

[73] Assignee: Hitachi, Ltd., Tokyo, Japan

[21] Appl. No.: 442,196

[22] Filed: Nov. 28, 1989

[30] Foreign Application Priority Data

Nov. 28, 1988 [JP] Japan .................... 63-298084

[51] Int. Cl.$^5$ .............................. G06K 9/32
[52] U.S. Cl. ..................... 382/46; 340/727; 364/731; 382/57
[58] Field of Search .......... 382/46, 57; 340/727; 358/22; 364/731

[56] References Cited

U.S. PATENT DOCUMENTS

| | | | |
|---|---|---|---|
| 4,618,991 | 10/1986 | Tabata et al. | 382/46 |
| 4,637,057 | 1/1987 | Kermisch | 382/46 |
| 4,759,076 | 7/1988 | Tanaka et al. | 382/46 |
| 4,829,452 | 5/1989 | Kang et al. | 382/46 |

Primary Examiner—Leo H. Boudreau
Attorney, Agent, or Firm—Fay, Sharpe, Beall, Fagan, Minnich & McKee

[57] ABSTRACT

In an image data rotating system for applying rotation processing to input image data of a large picture plane, the image data is divided into rectangular small blocks and rotation processing is applied to the image data of each block. The rotation processing to the image data of each block is performed by first reducing in the x-axis direction and enlarging in the y-axis direction. Then the first oblique axis transformation is applied. Any error data between the real oblique axis and the image element found in the final raster of the corresponding region is held in a memory. Subsequently, the second oblique axis transformation in the y-axis direction is applied, and error data is held in similar manner. Error data held as the initial value for the rotation processing to the image data of the adjacent region block is used, thereby allowing the rotation of the image data of a large picture plane to an arbitrary angle to be executed at high speed.

16 Claims, 5 Drawing Sheets

ROTATION PROCESSING METHOD OF IMAGE AND SYSTEM THEREFOR

BACKGROUND OF THE INVENTION

The present invention relates to a rotation processing method for the processing of image data wherein the rotation of the image data is for an arbitrary angle. More particularly, the present invention is directed to a rotation processing method of an image and a system to provide a favorable rotational image of a large picture plane having high quality which is economically obtained. In recent years, electronic filing systems using optical disks or other large storage devices have been used for advancing paperless processing in the office environment.

Additionally, such systems are also beginning to be used for image processing of documentation. In accordance with such trends, a high degree of quality is required in the image processing unit incorporated within such an electronic filing system. The image processing units being required not only to have real image processing functions of enlarging/reducing and 90 degree rotation, but also of rotation of the image for arbitrary angles.

In general, rotation of image element data with an arbitrary angle is a form of affine transformation. Assuming image element coordinates of an original image are designated (x,y), image element coordinates of the rotated data are designated (X,Y), and the rotational angle is designated $\theta$, the rotation of the image having an arbitrary angle may be defined by the equation $$\begin{bmatrix} X \\ Y \end{bmatrix} = \begin{bmatrix} \cos\theta & -\sin\theta \\ \sin\theta & \cos\theta \end{bmatrix} \begin{bmatrix} x \\ y \end{bmatrix} \quad (1)$$

In the above mentioned method, image element data is exchanged for each image element in accordance with expression (1). Calculating each image element individually requires extremely large calculations. Thus, requiring extended transformation time to process all of the image element data. An example of an apparatus used to eliminate such a disadvantage is seen in U.S. Pat. No. 4,618,991 by Tabata et al. "Processing Method For The Rotation Of An Image" (patented on Oct. 16, 1986) assigned to Hitachi, Ltd.

In the above-mentioned prior art, instead of transforming each image element, several adjacent picture elements are transferred simultaneously thereby attaining high speed processing. That is, assuming $$T_1 = \begin{bmatrix} 1 & -\tan\theta \\ 0 & 0 \end{bmatrix} \quad (2)$$

$$T_2 = \begin{bmatrix} \cos\theta & 0 \\ 0 & \sec\theta \end{bmatrix} \quad (3)$$

$$T_3 = \begin{bmatrix} 1 & 0 \\ \tan\theta & 1 \end{bmatrix} \quad (4)$$

expression (1) can be transformed as follows:

$$\begin{bmatrix} X \\ Y \end{bmatrix} = T_3 \cdot T_2 \cdot T_1 \begin{bmatrix} x \\ y \end{bmatrix} \quad (5)$$

Wherein matrixes $T_1$, $T_3$ represent oblique access transformations, and matrix $T_2$ represents transformation for enlarging/reducing. Therefore, the original image is processed in the sequence of:
$T_1$(oblique access transformation),
$T_2$(enlarging/reducing transformation) and
$T_3$(oblique access transformation).

In this manner, the rotational image of arbitrary angle $\theta$ is obtainable. In this form of transformation processing, the oblique access transformation can be realized in that the shift amount is varied and that the adjacent picture elements are transferred simultaneously. Additionally, the enlarging/reducing at high speed is obtained by established conventional technology.

In the above described prior art, the oblique axis transformations and the enlarging/reducing transformation are applied to the original image such that the rotational image is obtained. Consequently, the process for each image element as shown in expression (1) becomes unnecessary and the rotation processing can be attained at a high speed.

In addition, a "skew coordinate transformation" described in U.S. Pat. No. 4,618,991 has the same meaning as that of the "oblique axis transformation" in the present specification, and as is clearly shown in matrixes (2), (4), it means that a rectangular region is transformed into a parallelogram region without varying the width of the image. Additional prior art in the present technical field includes Japanese Patent Application Laid Open Nos. 117061/1982, 1176151/1982, 189762/1983, 214969/1984.

In the above described prior art, the coordinate transformation is applied to the image element data of the original image a plurality of times in order to obtain the rotational image. Consequently, a memory is required to store intermediate results during each coordinate transformation process. The capacity of the required memory being dependent upon the size of the original image. That is, the required memory capacity increases in proportion to the area of the original image. Since the above described prior art is directed mainly to relatively small areas, the above mentioned memory requirements do not become important.

On the other hand, utilizing an image processing method as above in an electronic filing system such as disclosed in U.S. Ser. No. 186,162 by Y. Kurose et al. "Electronic Filing System" (filed on Apr. 26, 1988, previously filed by the present inventor) results in certain drawbacks. In Kurose et al. a wide range of different image sizes are processed where part of the image slanted to the skew correction where the whole image inputted slant wise is restored to its normal state. The memory capacity required for the intermediate results of such processing becomes very large, for example, 16 MB in the picture plane of A1 size (A1 refers to a size of office paper designated by the Japanese Industry Standard and it is approximately 33 inches × 23.4 inches). Consequently, it becomes essential in practice that the image of the large picture plane is processed by dividing it into smaller regions.

However, in the above mentioned prior art the matching at the dividing point of the regions has not been fully considered and local distortion will at times be generated in the image in the vicinity of the dividing point. That is, since the oblique axis transformation for the image elements arranged in the square lattice type produce errors between the real oblique axis and the shifted image element, the shift amount in the next region needs to be determined after adjustment for this original error. Since in the prior art the transformation is made assuming that the error in the dividing point is 0, the slanting of the oblique axis may become shallow. This point will be described with reference to FIGS. 3B, and 3C.

Figure 3A:
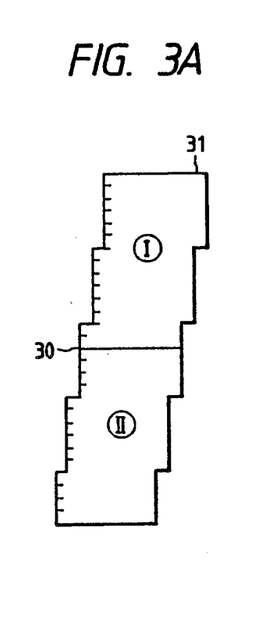
FIGS. 3A, 3B and 3C are schematic diagrams illustrating dividing and rotating processing of image, FIG. 3A being for the invention and FIGS. 3B and 3C being for the prior art.
Figure 3B:
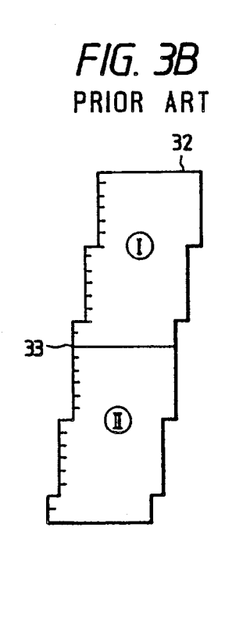
Figure 3C:
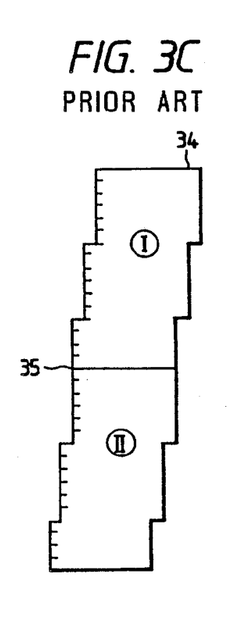

FIGS. 3B and 3C show examples of the oblique axis transformation for blocks of small regions divided in two (an example corresponding to a rotation with an angle of approximately 10 degrees). The Roman numerals are used to represent the processing order of the divided blocks. FIG. 3B shows an oblique axis transformation image 32 with a height of 28 dots (the dots being represented by dash lines in the figures) divided by a dividing point 33. FIG. 3C shows an oblique axis transformation image 34 with a height of 32 dots divided by a dividing point 35. In the present situation, it is assumed that for correct oblique axis transformation, it is necessary to shift 6 dots in the y direction for each 1 dot in the x direction.

In FIG. 3B, the divided two parts of the image 32 are independently processed, and the image is shifted by 8 dots in the y direction for each 1 dot in the x direction when the transformation is near the dividing point 33. Thus, an error of 2 dots exist. Distortion also occurs in FIG. 3C in the oblique axis transformation of image 34. In FIG. 3C instead of 1 dot in the x direction for every 6 dots in the y direction, the distortion actually increases to 10 dots in the y direction for every dot in the x direction near the dividing point 35. Thus, an error of 4 dots exist.

Therefore, rotating an image by an arbitrary angle accompanied by the dividing of the image into smaller regions may produce errors in distortions near the dividing point, thus lowering the high quality of the processed image.

SUMMARY OF THE INVENTION

An object of the present invention is to provide a method and system for rotation processing of an image, wherein even if an image of a large picture plane is inputted, a high quality rotational image, without distortion, can be obtained without increasing memory capacity for storing intermediate results.

Another object of the present invention is to provide a method and system for rotation processing of an image, wherein image data of a large picture plane can be rotated using a memory of small capacity without marring the image quality.

Another object of the invention is to provide a method and system for rotation processing of an image, wherein image data of a large picture plane can be rotated to an arbitrary angle at high speed.

Another object of the invention is to provide a method and system for rotation processing of an image, wherein processing, including rotation of an arbitrary angle can be supplied at high quality and high speed to dot data such as inputted characters, patterns, images or the like.

In order to attain the foregoing objects, in the present invention, when image data of the object to be processed is divided into blocks of small regions and the rotation processing is performed for each divided region block in sequence, error between the real oblique axis at the dividing point and the shift amount of the image element is transmitted to an adjacent region block and the transmitted error is utilized for the rotation processing of the adjacent region block.

That is, image data is divided into blocks of small regions so that it can be stored in a memory of assigned capacity, and the rotation processing is performed for each block of individual regions. Upon the completion of the rotation processing of one region block, any error between the real oblique axis at the dividing point and the shift amount of the image element is transmitted to the adjacent region block. During the rotation processing of the adjacent block, the transmitted error is used as an initial value. This rotation processing is applied to the divided blocks of small regions in sequence.

Also, in order to attain the foregoing objects, the invention provides an image rotating system comprising means for dividing the image data of the processing object into small region blocks, means for transmitting the error data between the real oblique axis in the dividing point of the divided region blocks and the shift amount of the image element to the adjacent region block, and means for performing the rotation processing for each region block using the transmitted error data.

More specifically, the image rotation processing system is constituted by a memory means for storing inputted image data, an address generating means for cutting-out the image data stored in the memory means into small region blocks, a holding means for holding error data of the image data of each region block at the end of oblique axis transformation, and means for performing oblique axis transformation of a region at the starting point of the adjacent region block using the error data held by the holding means.

Preferably, in the oblique axis transformation means, image data of a large picture plane is divided into rectangular regions of suitable size and then stored in the memory means. The image data stored in the divided rectangular regions is first processed by the enlarging/reducing means in the x-axis and y-axis directions. Next, it is subjected to a first oblique axis transformation in the x-axis direction, and finally it is subjected to second oblique axis transformation in the y-axis direction.

In the first oblique axis transformation, shifting is performed for each raster in approximating to the real oblique axis, and the shifted image data is then transferred to the memory means. In the final raster, any error between the real oblique axis and the image element data is held in the holding means.

In the second oblique axis transformation, shifting is performed in parallel to the y-axis direction and in approximating to the real oblique axis in sequence, and any error of the base of the region block is held in the holding means. The error held is used as the initial value during the rotating processing of the adjacent rectangular region block.

In the second oblique axis transformation to the y-axis direction, the image data stored in the memory means is rotated clockwise by 90 degrees. Thereby avoiding the necessity of shifting in the y-axis direction which is more difficult than shifting in the x-axis direction since the raster direction coinsides with the x-axis direction. In this case, the shifting is performed in approximating to the real oblique axis for each raster, and the shifted data of the large picture plane is transferred to the memory means. Also in this case, any error of the final raster is held in the holding means so as to provide it for the processing of the adjacent rectangular region. Finally, in order to restore the image data to the normal rotational angle, it is subjected to counter rotation of 90 degrees and outputted as the rotational image of the rectangular region. According to the above-mentioned procedure, the image data of the large picture plane is processed repeatedly until all data can be rotated.

An example of the oblique axis transformation of the present invention (corresponding to rotation of angle of about 10 degrees) will be described referring to FIG. 3A. FIG. 3A shows an oblique axis transformation image 31 with height of 28 dots divided by a dividing point 30. The oblique axis transformation image 31 transfers 6 dots in the y direction for every 1 dot in the x direction irrespective of the dividing point. This is accomplished in the present invention by accounting for any error and passing that information along. For example, if there is an error of 2 dots in the first region I, this information is transmitted to the second region II, so that the error can be accounted for in the processing of the second region II.

In the present invention, image data is used as a general term for various different types of data used in image formations.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DESCRIPTION OF THE PREFERRED EMBODIMENTS

Referring now to the drawings wherein the showings are for purposes of illustrating the preferred embodiment of the invention only and not for purposes of limiting same, first, expansion of expression (1) adopted in the embodiment will be described. That is, $$T_1 = \begin{bmatrix} \cos\theta & 0 \\ 0 & \sec\theta \end{bmatrix} \quad (6)$$

$$T_2 = \begin{bmatrix} 1-\sin\theta\cos\theta \\ 0 & 1 \end{bmatrix} \quad (7)$$

$$T_3 = \begin{bmatrix} 1 & 0 \\ \tan\theta & 1 \end{bmatrix} \quad (8)$$

being defined, corresponding to expression (5), expression (1) becomes $$\begin{bmatrix} X \\ Y \end{bmatrix} = T_3 \cdot T_2 \cdot T_1 \begin{bmatrix} x \\ y \end{bmatrix} \quad (9)$$

Wherein $T_1$ represents a matrix for enlarging/reducing and $T_2$ and $T_3$ represent matrixes of oblique axis transformation respectively. Thus the expansion can be changed conforming to the system to be applied.

Figure 1:
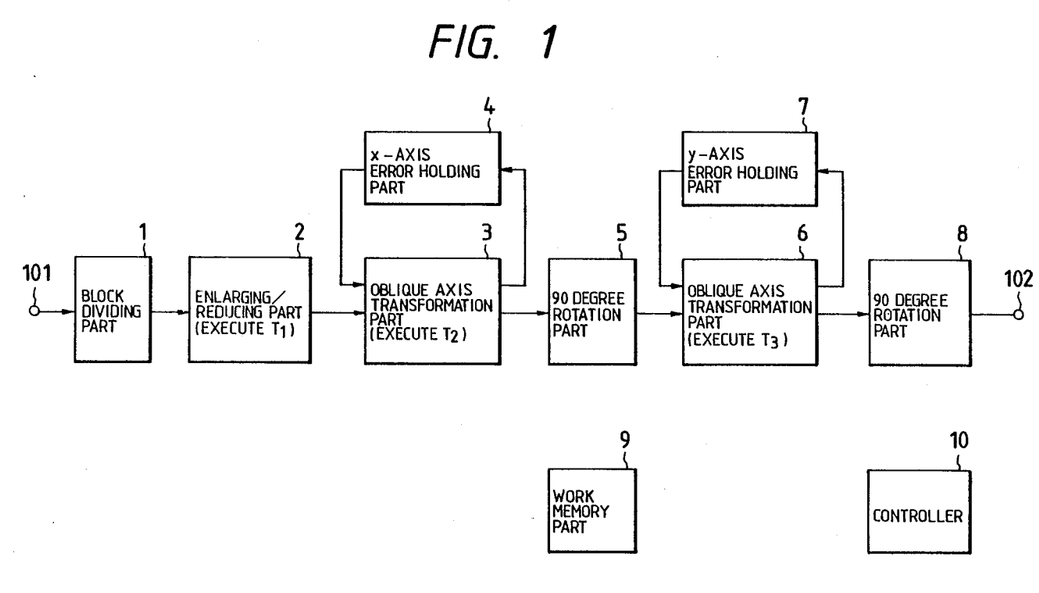
FIG. 1 is a function block diagram illustrating an embodiment of the invention.

FIG. 1 is a block diagram illustrating functional make-up of the present embodiment. In FIG. 1, numeral 1 designates a block dividing part for dividing inputted image into arbitrary regions, numeral 2 designates an enlarging/reducing part for executing transformation $T_1$, numeral 3 designates an oblique axis transformation part for executing transformation $T_2$, and numeral 4 designates an x axis error holding part for temporarily holding any error in the x-axis direction occurring in the previous block. Numeral 5 designates a 90-degree rotation part for realizing transformation $T_3$ by shifting in the x-axis direction not in the y-axis direction, numeral 6 designates an oblique axis transformation part for executing transformation $T_3$, numeral 7 designates a y-axis error holding part for temporarily holding any error in the y-axis direction in the previous block, and numeral 8 designates a −90−degree rotation part for restoring the orthogonal transformation executed by the oblique axis transformation (part 6) into the original state. Numeral 9 designates a work memory part for storing interim results produced for each processing, numeral 10 designates a controller for general overall control of each processing part, numeral 101 designates an input terminal for inputting original image data, and numeral 102 designates an output terminal for outputting rotation image data.

Figure 2:
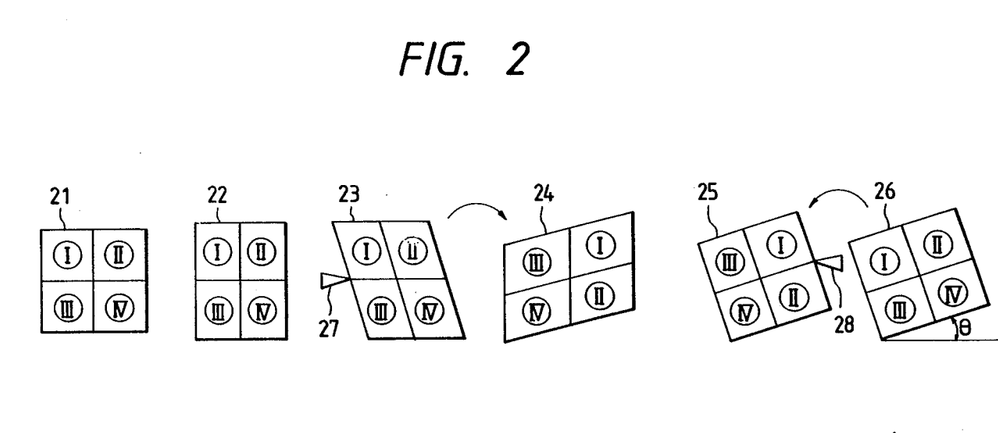
FIG. 2 is a schematic diagram of processing procedure of divided image illustrating the operation principle of the invention.

FIG. 2 is a model diagram illustrating operation of the rotation processing in FIG. 1. The Roman numerals are used to represent the order in which the divided regions are processed. Numeral 21 designates an image divided by the block dividing part 1, numeral 22 designates an image corrected by the enlarging/reducing part 2, numeral 23 designates an image shifted in the x-axis direction along the oblique axis by the oblique axis transformation part 3, numeral 24 designates an image subjected to clockwise rotation by the 90-degree rotation part 5, and numeral 25 designates an image shifted in the y-axis direction along the oblique axis by the oblique axis transformation part 6. Numeral 26 designates an image subjected to counterclockwise rotation by the 90-degree rotation part 8, numeral 27 designates a position where an error between a shift amount in the x-axis direction and the oblique axis is to be transmitted (final raster), and numeral 28 designates a position where an error between a shift amount in the y-axis direction and the oblique axis is to be transmitted (final raster).

Next, the operation of the embodiment will be described in detail with reference to FIGS. 1 and 2

First, image data is supplied through the input terminal 101 to the block dividing part 1. The block dividing part 1 cuts out data from the image data 21 as a whole to a rectangular region of suitable size by a transfer operation Subsequently, the image data 21 being cut out is subjected to the rotation processing for each of the rectangular regions represented by the Roman numerals, and is thereafter recombined. The number of regions into which the data image is divided is determined depending upon the size of the work memory part 9 capable of being used, and is not necessarily four (4) as shown in FIG. 2.

The image data being cut out is inputted through the work memory part 9 to the enlarging/reducing part 2. The enlarging/reducing part 2 executes transformation $T_1$ of expression (6) to the inputted image data. Transformation $T_1$ performs reducing in the x-axis direction by $\cos\theta$ and enlarging in the y-axis direction by $\sec\theta$, and produces the corrected image data 22.

The image data subjected to enlarging/reducing, which has been stored into the work memory part 9, is then inputted through the work memory part 9 to the oblique axis transformation part 3. The oblique axis transformation part 3 executes transformation $T_2$ of expression (7) to the inputted image data. Transformation $T_2$ l is realized by a shift of displacement ($-\sin\theta\cos\theta$) in the x-axis direction, producing the image data 23 transformed to the oblique axis. Also any error between the shift amount of the final raster 27 and the oblique axis is calculated, and stored in the x-axis error holding part 4. The x-axis error holding part 4 outputs the error held to the oblique axis transformation part 3 when the adjacent rectangular region III is processed. The error inputted at the processing of the rectangular region III is provided for the initial value of the error.

The image data 23 subjected to the first oblique axis transformation, which has been stored in the work memory part 9, is then inputted through the work memory 9 to the 90-degree rotation part 5. The 90-degree rotation part 5 executes 90-degree rotation clockwise to the inputted image data, and produces the rotation image data 24. The 90-degree rotation processing transforms the transformation $T_3$ of expression (8) from the y-axis direction where it is difficult for the apparatus in the memory access functions into the x-axis direction which is the same direction as the raster direction thus allowing simpler memory access.

The image data 24 subjected to the 90-degree rotation, which has been stored into the work memory part 9, is then inputted through the work memory part 9 to the oblique axis transformation part 6. The oblique axis transformation part 6 executes transformation $T_3$ of expression (8) to the inputted image data. Transformation $T_3$ is realized by a shift of displacement $\tan\theta$ in the y-axis direction, and since the input image has been previously subjected to the 90-degree rotation, the transformation $T_3$ is realized by the shift of displacement $\tan\theta$ to the x-axis direction. Then the image data 25 transformed to the oblique axis in the y-axis direction of the original image is produced. Also any error between the shift amount of the final raster 28 and the oblique axis is calculated, and stored in the y-axis error holding part 7. The y-axis error holding part 7 outputs the stored error when the adjacent rectangular region II is processed. The error inputted at the processing of the rectangular region II becomes the initial value.

The image data 25 subjected to the oblique axis transformation to the y-axis of the original image data and which has been stored into the work memory part 9 is then inputted through the work memory 9 to the 90-degree rotation part 8. The 90-degree rotation part 8 executes 90-degree rotation counterclockwise to the inputted image data, and produces the rotation image data 26. The 90-degree rotation processing performs the transformation to negate the rotation processing applied by the 90-degree rotation part 5.

According to the above-mentioned procedure, rotation is applied in sequence to the rectangular regions I, II, III, IV, and thus image data as a whole, divided in four, is rotated. In the function description of the present embodiment, control signals are supplied from the controller 10 to each of the parts of FIG. 1 and signals informing the state of each of the parts are given to the controller 10. However, since this is not necessary in explaining the function of the embodiment, further description shall be omitted.

Figure 4:
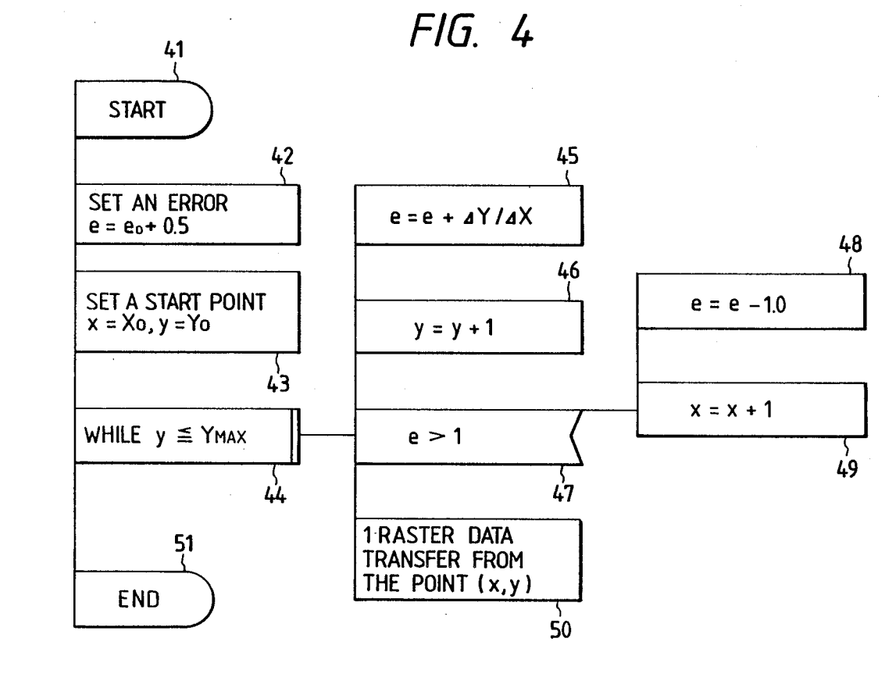
FIG. 4 is a problem analysis diagram illustrating specific processing procedure of oblique axis transformation in an embodiment of the invention.

Next, the function of oblique axis transformation parts 3 and 6 in FIG. 1 will be described in greater detail with reference to FIGS. 4 and 5. FIG. 4 is a program analysis program (hereinafter referred to as "PAD") illustrating the specific processing procedure of oblique axis transformation parts 3 and 6. Such processing taking place, for example, in an image processor such as the image processor 54 of FIG. 5.

In FIG. 4, block 41 represents the starting statement of the processing procedure. Block 42 represents that the error in an adjacent rectangular region is set as the initial value for the processing of the present rectangular region. In block 43, the starting point address of the corresponding rectangular region is set. A block 44 represents that processing in the y-axis direction is repeated from address $Y_o$ to $Y_{max}$. The processing in the y-axis direction means processing in blocks 45–50 which are connected to block 44.

In block 45, gradient $\Delta Y/\Delta X$ of the oblique axis is added to error e. In block 46, the address of the y coordinates is incremented by 1. In block 47, judgment is performed regarding whether the error e is greater than 1. If the error e is greater than 1, process is branched to block 48, and if it is not greater than 1, blocks 48 and 49 are omitted and process is branched to the block 50. In block 48, integer parts 1.0 are subtracted from the error e. In the block 49, the starting point of the x coordinates is incremented by 1. In block 50, coordinates (x, y) are transferred by 1 raster to the starting point. The procedure described from block 45 through block 50 is repeated until the Y coordinates attain $Y_{max}$. Upon reaching $Y_{max}$ the oblique axis transformation is finished and processing is transferred to block 51.

As clearly understood from the above description, according to the present embodiment, since the large picture plane can be processed by being divided into small region blocks without marring the quality of the rotation image, images from large picture planes and small picture planes can be processed without increasing the memory needed to store interim results.

In the present embodiment, in order to correct distortion attendant to the oblique axis transformation, the enlarging/reducing transformation $T_1$ is provided on the forefront stage, but in the case of the application to a field where distortion does not become a problem, the enlarging/reducing part 2 may be omitted.

Also, in the present embodiment the 90-degree rotation parts 5 and 8 are inserted on front and rear sides of the oblique axis transformation part 6, and shift in the y-axis direction is realized in the x-axis direction. However, when the invention is applied to a field where the high speed processing is not required, the 90-degree rotation parts 5 and 8 may be omitted.

Next, an embodiment of a system implementing the present invention will be described in detail with reference to FIG. 5.

Figure 5:
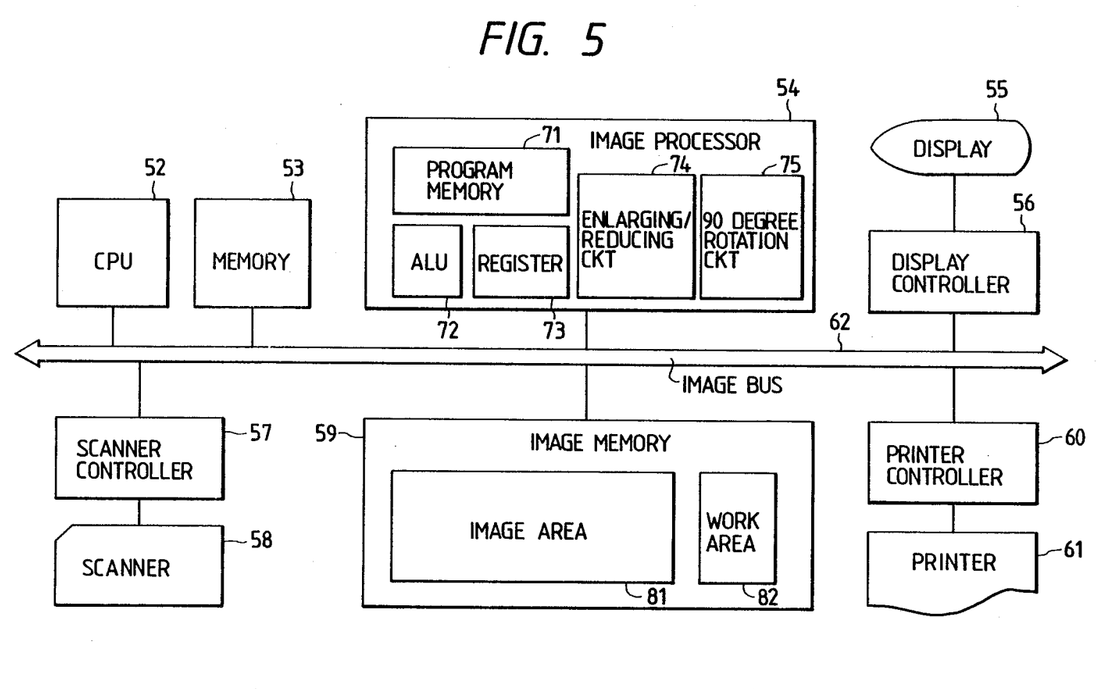
FIG. 5 is a system block diagram illustrating another embodiment of the invention.

The function performed by the system shown in FIG. 5 is similar to that shown in the embodiment of FIG. 1. In FIG. 5, numeral 52 designates a central processing unit (CPU) which controls the overall system, numeral 53 designates a memory for storing programs used to control the CPU 52 and for storing various types of tables, numeral 54 designates an image processor for executing the rotation processing at an arbitrary angle, numeral 55 designates a display for displaying the image data, and numeral 56 designates a display controller for generating a synchronous signal which it then transfers together with the image data to the display 55.

Numeral 57 designates a scanner controller for generating a drive signal which is supplied to a scanner and which then transfers image data onto a bus, and numeral 58 designates a scanner for converting a paper surface or the like into electric image data. Numeral 59 designates an image memory for receiving and storing the inputted data from the scanner 58 through the scanner controller 57, numeral 60 designates a printer controller for generating a drive signal which is supplied to a printer 61 and which then transfers the image data to the printer, numeral 61 designates a printer for outputting the image data to a paper surface, and numeral 62 designates an image bus for exchanging the image data between respective devices.

In the image processor 54, numeral 71 designates a program memory for storing the processing procedure of rotation at an arbitrary angle, numeral 72 designates an ALU for executing address calculations of the image data, numeral 73 designates a register for storing the error quantity between blocks, numeral 74 designates an enlarging/reducing circuit for executing the enlarging/reducing at high speed, and numeral 75 designates a 90-degree rotation circuit for executing the 90-degree rotation at high speed.

Further in the image memory circuit 59, numeral 81 designates an image area for storing image data before rotation and after rotation, and numeral 82 designates a work area for storing image data at the midway of rotation. An example of a type of image processor which maybe used as the image processor 54 of FIG. 5 is the IC, Logical Image Controller CMN 8617 manufactured by Matsushita Electronics Corp.

Next, the operation of the present embodiment will be described referring to FIGS. 2 and 5. First, based on programs stored in memory 53, the CPU 52 sends start commands to the scanner controller 57. The started scanner controller 57 drives the scanner 58 and inputs the image data 21 (FIG. 2). The inputted data 21 is stored through the scanner controller 57 and the image bus 62 into the image area 81 in the image memory 59.

Subsequently, the CPU 52 sends a start command to the image processor 54, and executes rotation, at an arbitrary angle, of the image data 21 stored in the image area 81. The address of the image data is calculated in accordance with the program memory 71. A rectangular region of suitable size is cut out of the entire image data stored in the image area 81, and is stored in the work area 82. Thereafter, the cut-out image data 21 is subjected to rotation processing for each rectangular region represented by Roman numerals and ultimately the regions are recombined to form the whole image.

The cut-out image data 21 is inputted to the enlarging/reducing circuit 74, and is subjected to transformation $T_1$ of expression (6). The image data 22 (FIG. 2) which has been subjected to transformation $T_1$ is then stored in the work area 82.

The image data 22 is transferred within the work area 82 in accordance with the address calculation of the ALU 72, and transformation $T_2$ of expression (7) is applied. Then the error between the shift amount of the final raster 27 (FIG. 2) and the oblique axis is calculated by the ALU 72, and stored in register 73. The image data 23 subjected to the first oblique axis transformation is inputted to the 90-degree rotation circuit 75 and is subjected to a 90-degree clockwise rotation. The image data 24 (FIG. 2) subjected to the 90-degree rotation is again stored in the work area 82.

The image data 24 subjected to the 90-degree rotation is transferred within the work area 82 in accordance with the address calculation of the ALU 72, and transformation $T_3$ of expression (8) is applied. Additionally, in a manner similar to the transformation $T_2$, the error between the shift amount of the final raster 28 (FIG. 2) and the oblique axis is calculated in the ALU 72, and stored in register 73.

The image data 25 (FIG. 2) subjected to the oblique axis transformation to the y axis of the original image is inputted to the 90-degree rotation circuit 75 and subjected to a 90-degree counterclockwise rotation.

In accordance with the above-mentioned procedure, rotation is applied to the rectangular regions I, II, III, IV in sequence thereby the image data as a whole divided in four can be rotated.

Finally, data is displayed through the display controller 56 to the display 55 if desired. Also data is printed through the printer controller 60 to the printer 61. When the embodiment is applied to an electronic filing system, data is transferred to a largecapacity image memory system such as an optical disk (not shown) and stored.

In addition, the equivalence of expression (1) and expression (9) is clear from following transformation.

$$\begin{bmatrix} X \\ Y \end{bmatrix} = \begin{bmatrix} \cos\theta & -\sin\theta \\ \sin\theta & \cos\theta \end{bmatrix} \begin{bmatrix} x \\ y \end{bmatrix}$$

$$= \begin{bmatrix} 1 & -\tan\theta \\ \tan\theta & 0 \end{bmatrix} \begin{bmatrix} \cos\theta & -\sin\theta \\ 0 & \sec\theta \end{bmatrix} \begin{bmatrix} x \\ y \end{bmatrix}$$

$$= \begin{bmatrix} 1 & 0 \\ \tan\theta & 0 \end{bmatrix} \begin{bmatrix} 1-\sin\theta\cos\theta \\ 0 & 1 \end{bmatrix} \begin{bmatrix} \cos\theta & 0 \\ 0 & \sec\theta \end{bmatrix} \begin{bmatrix} x \\ y \end{bmatrix}$$

In the method and system for processing a rotated image described above, oblique axis transformation and varying the shift amount for each raster, are utilized in order that image data at the midway of a transformation can be stored in a memory region of limited capacity. The memory region is divided into small region blocks and any error between the real oblique axis at the dividing point and the shift amount is transmitted to the adjacent region. Thus, the image data can be rotated in sequence for each small region block. In such a constitution, since the image data can be processed in a work memory of small capacity without marring the image quality, the image data of a large picture plane can be rotated without requiring the system to be of a large size and high cost. The invention has a large effect in the field of office automation such as an electronic filing system.

What is claimed is:

1. A method for rotation processing digital image data positioned on orthogonal coordinates by an arbitrary angle $\theta$, comprising the steps of:

dividing the image data into a plurality of blocks, the image data of each of said blocks being sequentially processed with the following steps;

enlarging/reducing the image data into two axis directions of the orthogonal coordinates;

first oblique axis transforming the image data in one of said axis directions, the image data being shifted by a first shift amount corresponding to the arbitrary angle $\theta$;

second oblique axis transforming the image data in another of said axis directions, the image data being shifted by a second shift amount corresponding to the arbitrary angle $\theta$; and transferring error data existing between at least one of said first and second shift amount and an oblique axis of each of said oblique axis transforming steps at a dividing point of each of said blocks, said error data being used for rotation processing the image data of an adjacent one of said blocks.

2. The rotation processing method according to claim 1, wherein:

said enlarging/reducing step executes multiplication to the image data by a matrix of $$\begin{bmatrix} \cos\theta & 0 \\ 0 & \sec\theta \end{bmatrix}.$$

3. The rotation processing method according to claim 1, wherein:

said first oblique axis transferring step executes multiplication to the image data by a matrix of $$\begin{bmatrix} 1 & -\sin\theta \cdot \cos\theta \\ 0 & 1 \end{bmatrix}.$$

4. The rotation processing method according to claim 1, wherein:

said second oblique axis transforming step executes multiplication to the image data by a matrix of $$\begin{bmatrix} 1 & 0 \\ \tan\theta & 1 \end{bmatrix}.$$

5. The rotation processing method according to claim 1, wherein:

said transferring step further includes the step of calculating said error data between at least one of said first and second shift amounts and said oblique axis of each of said oblique axis transforming steps at said dividing point of each of said blocks.

6. The rotation processing method according to claim 1, wherein:

said first oblique axis transforming step is executed in the direction of x-axis of the orthogonal coordinates and said second oblique axis transforming step is executed in the direction of y-axis of the orthogonal coordinates, and said second oblique axis transforming step includes the sequential steps of rotating the image data ny $+90$ degrees, oblique axis transforming said rotated image data in the direction of said x-axis, and rotating said transformed and rotated image data by $-90$ degrees.

7. A system for rotating image data by an arbitrary angle on orthogonal coordinates of image elements having image processing means, storage means connected to the image processing means for storing data and output means, the image processing means comprising:

means for dividing the image data into a plurality of data blocks;

means for oblique-axis transforming each image data of said divided data blocks in each axis direction of the orthogonal coordinates, positions of each image data on the orthogonal coordinates being shifted by amounts corresponding to the arbitrary angle; and means for storing error data between said amounts shifted by said transforming means and oblique axis to be transformed by said transforming means.

8. The image data rotating system according to claim 7, further comprising:

means for enlarging/reducing each of said divided data blocks.

9. The image data rotating system according to claim 7, wherein:

said oblique-axis transforming means includes means for rotating each of said divided blocks by $\pm 90$ degrees.

10. The image data rotating system according to claim 9, wherein:

the output means is a raster-type display means, a raster direction of which is the same as one axis of the orthogonal coordinates, before said oblique-axis transforming means transforms each image data of said divided data blocks in another axis direction of the orthogonal coordinates, said rotating means rotates each image data of said divided data blocks by $+90$ degrees, and after said oblique axis transforming means transforms each image data of said divided data blocks in another axis direction of the orthogonal coordinates, said rotating means rotates each of said divided data blocks by $-90$ degrees.

11. A system for rotating an image data region by an angle $\theta$ on orthogonal coordinates (x,y), said system having image processing means, image storing means for storing image data in a matrix corresponding to the orthogonal coordinates (x,y), input means, and raster-type display means, the image processing means comprising:

means for dividing the image data region into a plurality of rectangular data regions;

means for oblique-axis transforming each image data position of said rectangular data regions in two axis directions of the orthogonal coordinates (x,y), one of said two axis directions corresponding to a raster direction of the raster-type display means; and means for storing error data between a shift amount to each image data position shifted by said transforming means and an oblique axis to be transformed by said transforming means at a dividing point of said rectangular data regions.

12. The system according to claim 11, wherein:

said oblique-axis transforming means includes means for transforming each image data position of said said raster direction, each image data position being shifted by said shift amount corresponding to the angle θ, and means for rotating each image data position of said rectangular data regions by ±90 degrees.

13. The system according to claim 11, wherein:
said oblique-axis transforming means executes multiplication to each image position by matrixes of $$\begin{bmatrix} 1 & 0 \\ \tan\theta & 1 \end{bmatrix} \begin{bmatrix} 1-\sin\theta \cdot \cos\theta \\ 0 & 1 \end{bmatrix}.$$

14. The system according to claim 11, further comprising:
means for enlarging/reducing each of said rectangular data regions, wherein said enlarging/reducing means executes enlarging/reducing process to each image data position of said rectangular data regions prior to execution of said oblique-axis transforming means to each image data position of said rectangular data regions.

15. The system according to claim 14, wherein: said enlarging/reducing means executes multiplication to each image data position by a matrix of $$\begin{bmatrix} \cos\theta & 0 \\ 0 & \sec\theta \end{bmatrix}.$$

16. An image processor for rotating an image data region by an angle θ on orthogonal coordinates (x,y) together with image storage means for storing image data in matrix, input means, and output means, the image processor comprising:
means for dividing the image data region into a plurality of rectangular data regions;
means for transforming each image data position of said rectangular data regions in two axis directions of the orthogonal coordinates (x,y), said transforming means executing multiplication to each data position of each of said rectangular data regions by the following matrixes $$\begin{bmatrix} 1 & 0 \\ \tan\theta & 0 \end{bmatrix} \begin{bmatrix} 1-\sin\theta\cos\theta \\ 0 & 1 \end{bmatrix} \begin{bmatrix} \cos\theta & 0 \\ 0 & \sec\theta \end{bmatrix};$$

means for storing error data between a shift amount to each image data position shifted by said transforming means and an oblique axis to be transformed by said transforming means at each dividing point of said rectangular data regions, said error data being used by said transforming means in order to transform each image data position of an adjacent one of said rectangular data regions.

* * * * *

UNITED STATES PATENT AND TRADEMARK OFFICE
CERTIFICATE OF CORRECTION

PATENT NO. : 4,975,977

DATED : December 4, 1990

INVENTOR(S) : Yasuo Kurosu, et al.

It is certified that error appears in the above-identified patent and that said Letters Patent is hereby corrected as shown below:

Claim 6, column 12, line 3, please delete "ny" and insert therefor --by--.

Claim 12, column 13, lines 2 and 3, after "said" at the end of line 2 and before "said raster" at the beginning of line 3, please insert --divided data regions in said direction corresponding to--.

Claim 16, column 14, line 26, before "means" please insert --and--.

Signed and Sealed this

Thirty-first Day of March, 1992

Attest:

HARRY F. MANBECK, JR.

*Attesting Officer*   *Commissioner of Patents and Trademarks*